United States Patent
Ra

(10) Patent No.: US 11,775,579 B2
(45) Date of Patent: Oct. 3, 2023

(54) SERVER APPARATUS, INFORMATION PROCESSING APPARATUS, AND COMMUNICATION METHOD

(71) Applicant: CANON KABUSHIKI KAISHA, Tokyo (JP)

(72) Inventor: Rina Ra, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 17/033,030

(22) Filed: Sep. 25, 2020

(65) Prior Publication Data

US 2021/0103612 A1 Apr. 8, 2021

(30) Foreign Application Priority Data

Oct. 2, 2019 (JP) .............................. JP2019-182452

(51) Int. Cl.
*G06F 16/583* (2019.01)
*G06F 16/58* (2019.01)
*H04L 67/01* (2022.01)

(52) U.S. Cl.
CPC ........ *G06F 16/583* (2019.01); *G06F 16/5866* (2019.01); *H04L 67/01* (2022.05)

(58) Field of Classification Search
None
See application file for complete search history.

(56) References Cited

U.S. PATENT DOCUMENTS

| 10,990,495 | B1 * | 4/2021 | Cieslak | G06F 11/3055 |
| 2017/0286419 | A1 * | 10/2017 | Tang | G06Q 30/0241 |
| 2018/0107660 | A1 * | 4/2018 | Wang | G06F 16/284 |
| 2021/0006624 | A1 * | 1/2021 | Brewer | H04W 4/38 |

FOREIGN PATENT DOCUMENTS

JP 2014-206794 A 10/2014

* cited by examiner

*Primary Examiner* — Giuseppi Giuliani
(74) *Attorney, Agent, or Firm* — Canon U.S.A., Inc. IP Division

(57) ABSTRACT

A server apparatus which transmits, to a plurality of other server apparatuses each of which performs subject recognition for an image, an image acquired from a client terminal and requests the plurality of other server apparatuses to perform subject recognition receives a result of subject recognition from each of the plurality of other server apparatuses, transmits, to the client terminal, subject information to be appended to metadata of the image based on the received result of subject recognition, and performs control to switch whether to, each time a result of subject recognition is received from each of the plurality of other server apparatuses, transmit, to the client terminal, subject information that is based on the received result of subject recognition or to transmit, to the client terminal, subject information that is based on a result obtained by integrating results of subject recognition received from the plurality of other server apparatuses.

10 Claims, 11 Drawing Sheets

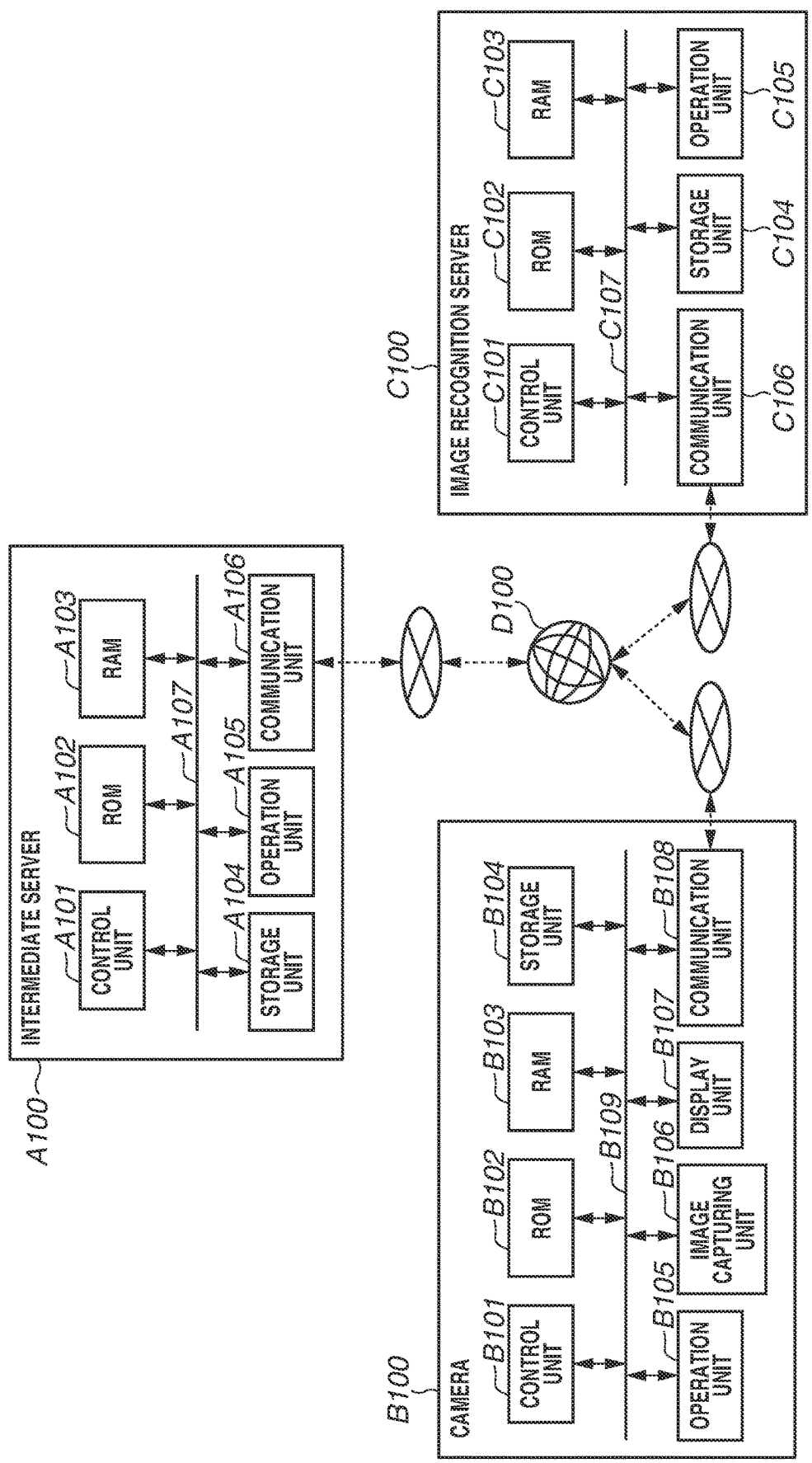

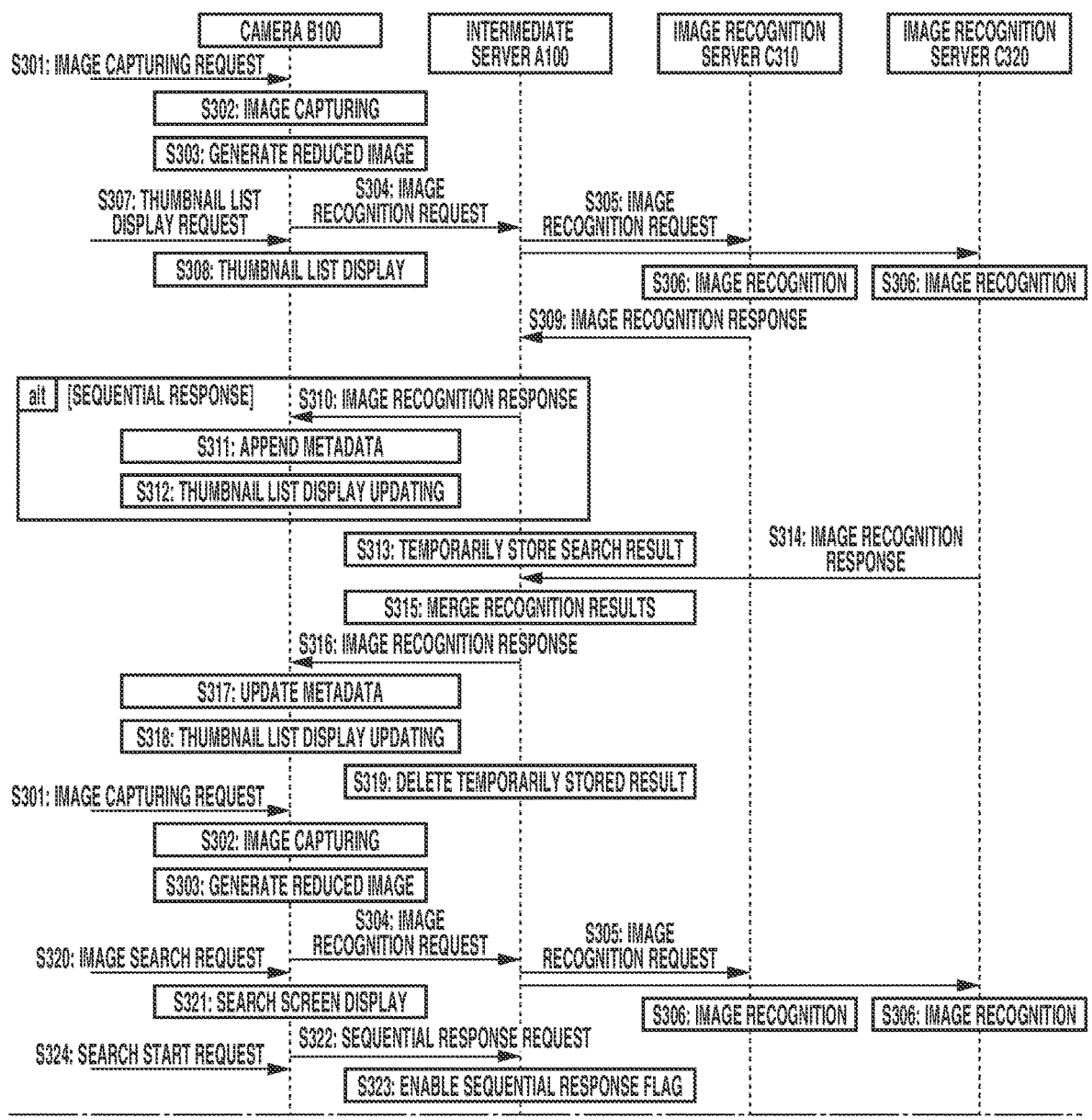

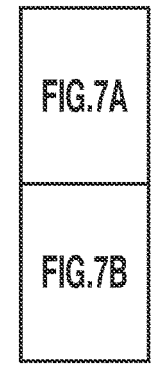
FIG.7A
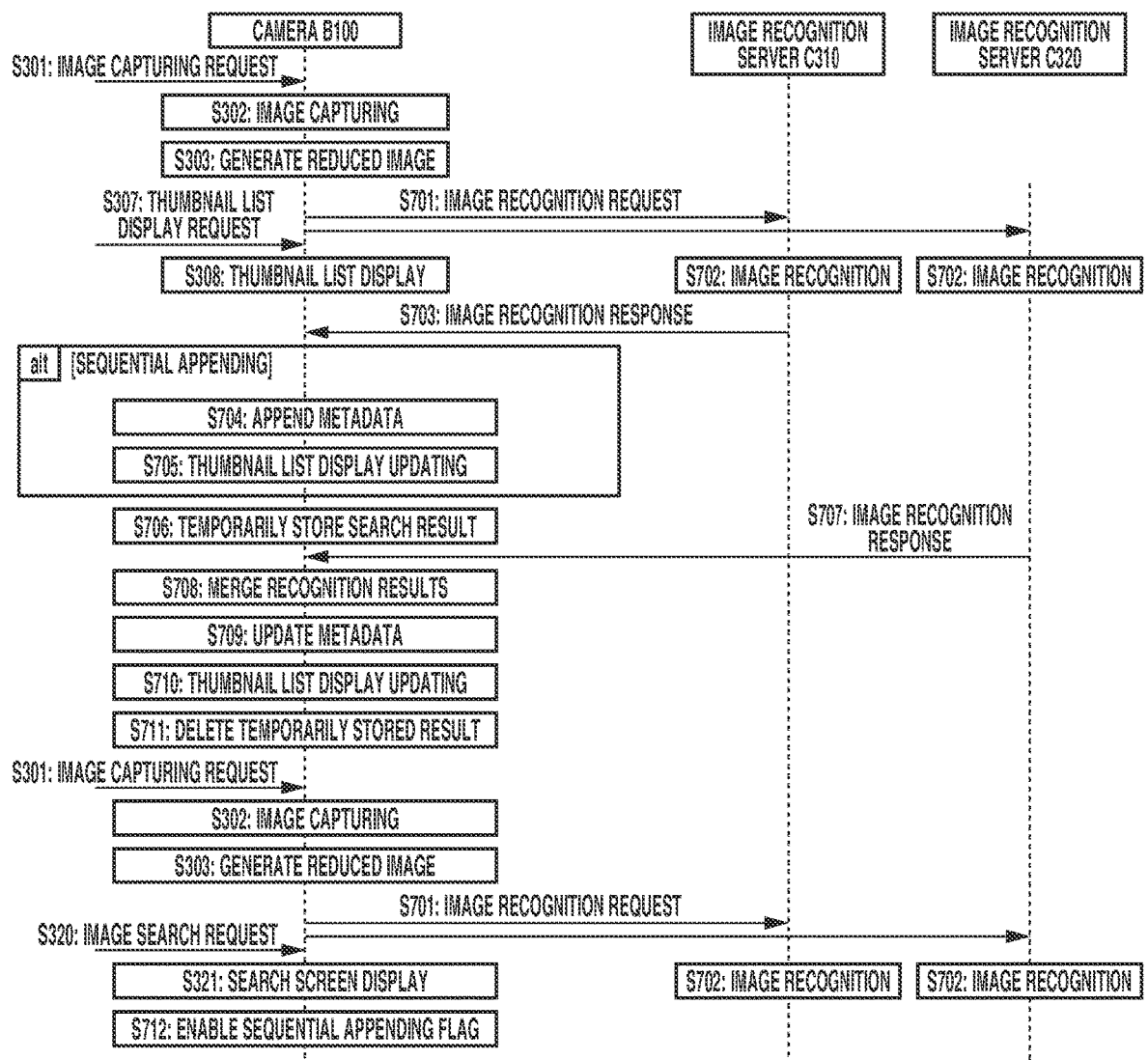

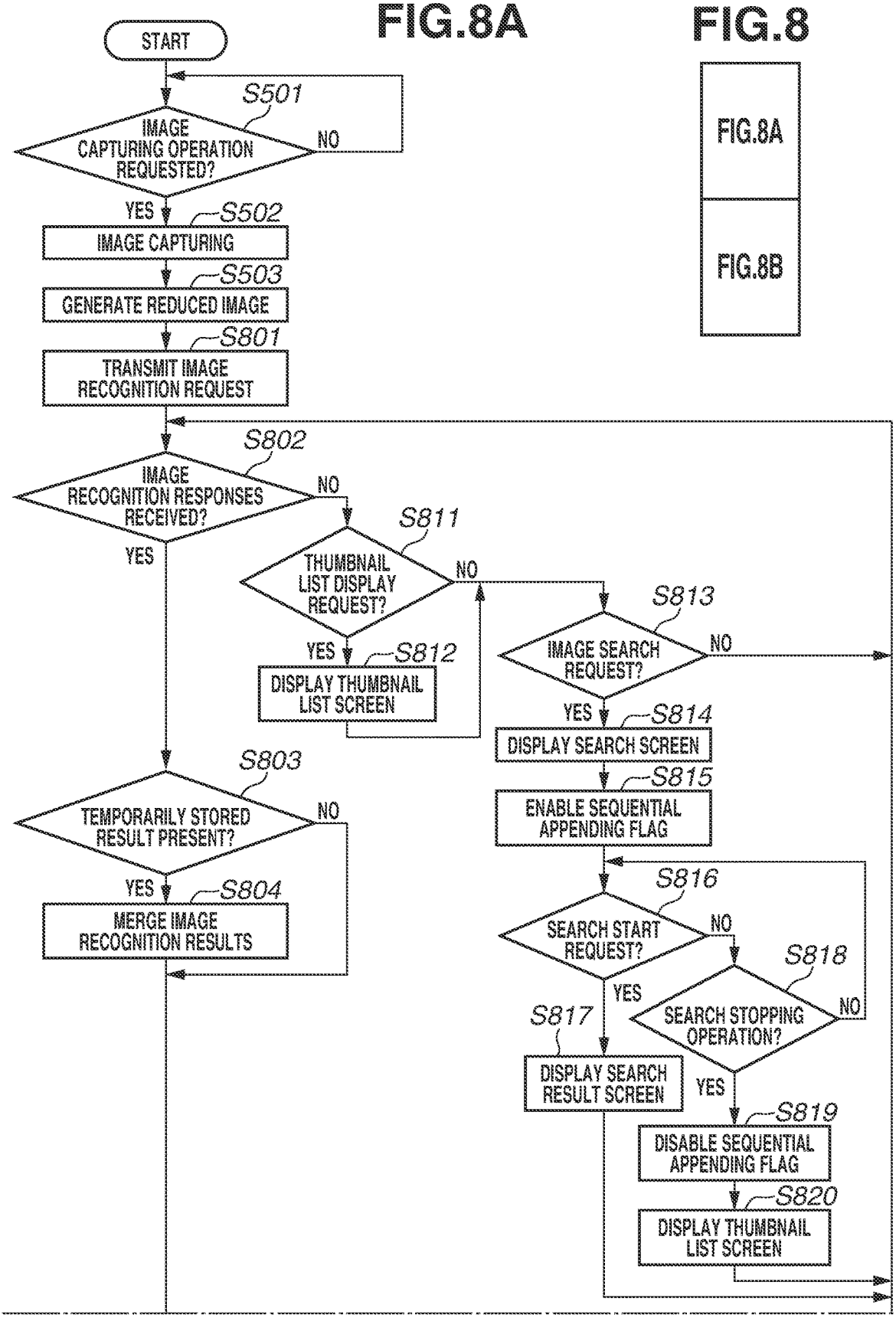
FIG.8A
FIG.8
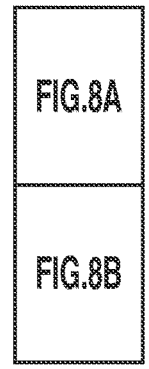

SERVER APPARATUS, INFORMATION PROCESSING APPARATUS, AND COMMUNICATION METHOD

BACKGROUND

Field

The present disclosure generally relates to a technology to perform communication with a server apparatus, which performs subject recognition of an image, and append subject information to metadata of the image based on a result of the subject recognition.

Description of the Related Art

Recently, artificial intelligence (AI) technologies centering on machine learning have been currently under active development. For example, a technology to automatically recognize information about a subject (for example, the name of a person, the name of an object, gender, and age) included in an image captured by a camera is currently under development. There is a plurality of cloud services that provides such a technology of subject recognition toward individuals and companies.

The use of a cloud service that performs subject recognition append subject information, serving as metadata, to an image captured by a camera. However, the cloud services that perform subject recognition have different features with respective service providing companies. Even if some cloud services are caused to perform subject recognition with respect to the same image, it is not always true that the same subject recognition result is returned. For example, with respect to an image in which "an apple, a banana, and a grape" are shown, while a service providing company A may return a result indicting "an apple and a banana", a service providing company B may return a result indicating "a banana and a grape".

Japanese Patent Application Laid-Open No. 2014-206794 discusses a technique to bring together pieces of information obtained from a plurality of services into one piece of information and transmit the one piece of information to a client. If this technique is applied to the above-mentioned method of appending subject information as metadata using a cloud service which performs subject recognition, integrating results of recognition provided by the service providing company A and the service providing company B as a logical sum enables obtaining a high-reliability subject recognition result indicating "an apple, a banana, and a grape".

However, in the case of integrating results of subject recognition provided by a plurality of cloud services, there is an issue in which it is not possible to append metadata before receiving subject recognition results from all of the cloud services. Therefore, if there is a cloud service which requires a long time before outputting a subject recognition result, it takes time for a camera to become able to use metadata. On the other hand, if appending of metadata is performed each time a subject recognition result is received from each cloud service, a processing load on the camera (for example, the usage rate of a central processing unit (CPU) or a memory, media access, and power consumption) may increase.

SUMMARY

According to an aspect of the present disclosure, a server apparatus which transmits, to a plurality of other server apparatuses each of which performs subject recognition for an image, an image acquired from a client terminal and requests the plurality of other server apparatuses to perform subject recognition includes a reception unit configured to receive a result of subject recognition from each of the plurality of other server apparatuses, a transmission unit configured to transmit, to the client terminal, subject information to be appended to metadata of the image based on the received result of subject recognition, and a control unit, wherein the control unit controls the transmission unit to switch whether to, each time a result of subject recognition is received from each of the plurality of other server apparatuses, transmit, to the client terminal, subject information that is based on the received result of subject recognition or to transmit, to the client terminal, subject information that is based on a result obtained by integrating respective results of subject recognition received from the plurality of other server apparatuses.

Further features will become apparent from the following description of exemplary embodiments with reference to the attached drawings.

BRIEF DESCRIPTION OF THE DRAWINGS

FIG. 1 is a set of respective block diagrams of an intermediate server, a camera, and an image recognition server in a first exemplary embodiment.

DESCRIPTION OF THE EMBODIMENTS

Figure 2A:
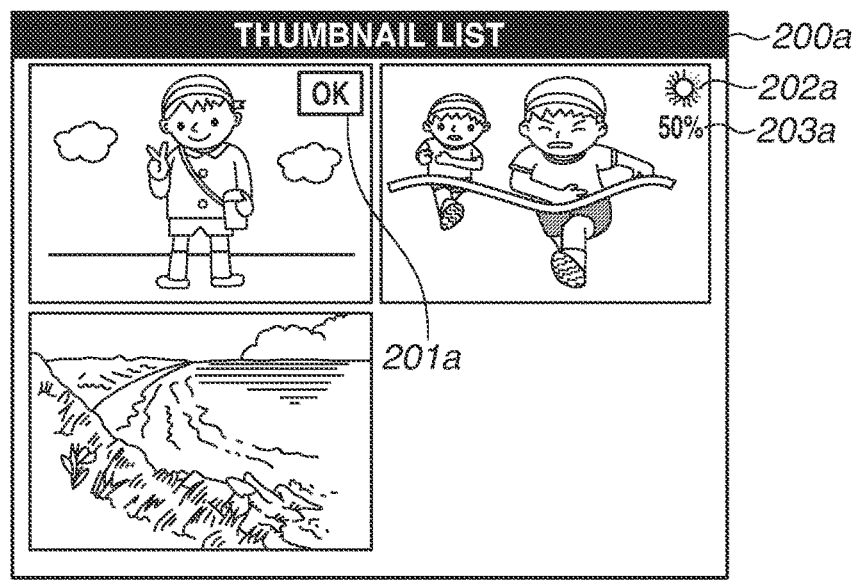
FIGS. 2A, 2B, and 2C are conceptual diagrams illustrating examples of a graphical user interface (GUI) which is displayed in the camera in the first exemplary embodiment.

Various exemplary embodiments, features, and aspects described in detail below with reference to the drawings.
<Configuration of Each Apparatus>

FIG. 1 is a set of block diagrams illustrating a configuration of the entire system in a first exemplary embodiment. The system in the first exemplary embodiment includes an intermediate server A100, a camera B100 a client terminal, an image recognition server C100 a cloud service for subject recognition, and an Internet D100. While in FIG. 1, only one image recognition server is illustrated, there are two or more image recognition servers with which the intermediate server A100 communicates.

First, the intermediate server A100 is described.

Each server apparatus can be implemented by a single computer apparatus, or can be implemented by respective functions distributed to a plurality of computer apparatuses as needed. In a case where a server apparatus is configured with a plurality of computer apparatuses, the plurality of computer apparatuses is interconnected via, for example, a local area network (LAN) in such a way as to be able to communicate with each other.

A control unit A101, which is, for example, a central processing unit (CPU), controls the entire intermediate server A100. The control unit A101 includes a program that determines whether to sequentially transmit, to the camera B100, each image recognition result received from the image recognition server C100 or to collectively transmit, to the camera B100, image recognition results received from the image recognition server C100, according to a predetermined condition. Furthermore, instead of the control unit A101 controlling the entire intermediate server A100, a plurality of pieces of hardware can share processing operations to control the entire intermediate server A100.

A read-only memory (ROM) A102, which is a rewritable non-volatile memory, stores programs, such as an operating system (OS), and programs supplied from an external apparatus.

A random access memory (RAM) A103, which is a volatile memory, temporarily stores programs and data.

A storage unit A104 is, for example, a hard disk drive (HDD), a solid state drive (SSD) configured with a flash memory, a hybrid drive configured with a hard disk and a flash memory, or a memory card, mounted in the intermediate server A100.

An operation unit A105 is a processing unit which receives an operation performed by the user as input information and communicates the input information to the control unit A101.

A communication unit A106 is a communication unit which is used to implement wired communication. The communication unit A106 is configured with hardware for implementing wired communication and a communication controller for processing a wired signal, and is used to implement wired communication compliant with the IEEE 802.3 series standard. The control unit A101 controls the communication unit A106 to implement communication with the camera B100 and the image recognition server C100 via the Internet D100.

An internal bus A107 interconnects the units A101 to A106 in such a manner that the units A101 to A106 are able to communicate with each other.

Thus far is the description of the intermediate server A100.

Next, the camera B100 is described.

A control unit B101, which is, for example, one or a plurality of processors such as CPUs, micro processing units (MPUs), or graphics processing units (GPUs), controls the entire camera B100. Moreover, the control unit B101 performs image processing on a still image received from an image capturing unit B106. Furthermore, instead of the control unit B101 controlling the entire camera B100, a plurality of pieces of hardware can share processing operations to control the camera B100.

A ROM B102, which is a rewritable non-volatile memory, stores programs, such as an operating system (OS), and programs supplied from an external apparatus.

A RAM B103, which is a volatile memory, temporarily stores, for example, programs, captured image data, and communication data.

A storage unit B104 is a memory card which is detachably attached to the digital camera B100. The storage unit B104 stores image data generated by the image capturing unit B106.

An operation unit B105 is a processing unit which receives an operation performed by the user as input information and communicates the input information to the control unit B101. The operation unit B105 is configured with, for example, a touch panel, button switches, or arrow keys.

The image capturing unit B106, which includes, for example, an imaging lens, a diaphragm, a shutter, an image sensor such as a complementary metal-oxide semiconductor (CMOS) sensor, and an analog-to-digital (A/D) converter, converts an analog signal input via the imaging lens into digital data, thus acquiring image data.

A display unit B107 is a processing unit for notifying the user of various messages indicating, for example, the operating status of the camera B100. The display unit B107 is configured with, for example, a liquid crystal panel or a light-emitting diode (LED).

A communication unit B108 is a communication unit used to implement wireless communication. The communication unit B108 includes an antenna used for wireless communication and a communication controller for processing a wireless signal. The communication unit B108 implements wireless communication compliant with, for example, the fifth generation mobile communication system. The control unit B101 controls the communication unit B108 to implement communication with the intermediate server A100 via the Internet D100.

An internal bus B109 interconnects the units B101 to B108 in such a manner that the units B101 to B108 are able to communicate with each other.

Thus far is the description of the camera B100.

Next, the image recognition server C100 is described.

A control unit C101, which is, for example, one or a plurality of processors such as CPUs, MPUs, or GPUs, controls the entire image recognition server C100. Furthermore, instead of the control unit C101 controlling the entire image recognition server C100, a plurality of pieces of hardware can share processing operations to control the image recognition server C100.

Moreover, the control unit C101 performs image recognition based on image data received by a communication unit C106.

A ROM C102, which is a rewritable non-volatile memory, stores programs, such as an operating system (OS), and programs supplied from an external apparatus.

A RAM C103, which is a volatile memory, temporarily stores, for example, programs, image data, and communication data.

A storage unit C104 is, for example, a hard disk drive (HDD), a solid state drive (SSD) configured with a flash memory, a hybrid drive configured with a hard disk and a flash memory, or a memory card, mounted in the image recognition server C100. An operation unit C105 is a processing unit which receives an operation performed by the user as input information and communicates the input information to the control unit C101.

The communication unit C106 is a communication unit which is used to implement wired communication. The communication unit C106 is configured with hardware for implementing wired communication and a communication controller for processing a wired signal, and is used to implement wired communication compliant with the IEEE 802.3 series standard. The control unit C101 controls the communication unit C106 to implement communication with the intermediate server A100 via the Internet D100.

An internal bus C107 interconnects the units C101 to C106 in such a manner that the units C101 to C106 are able to communicate with each other.

Figure 2B:
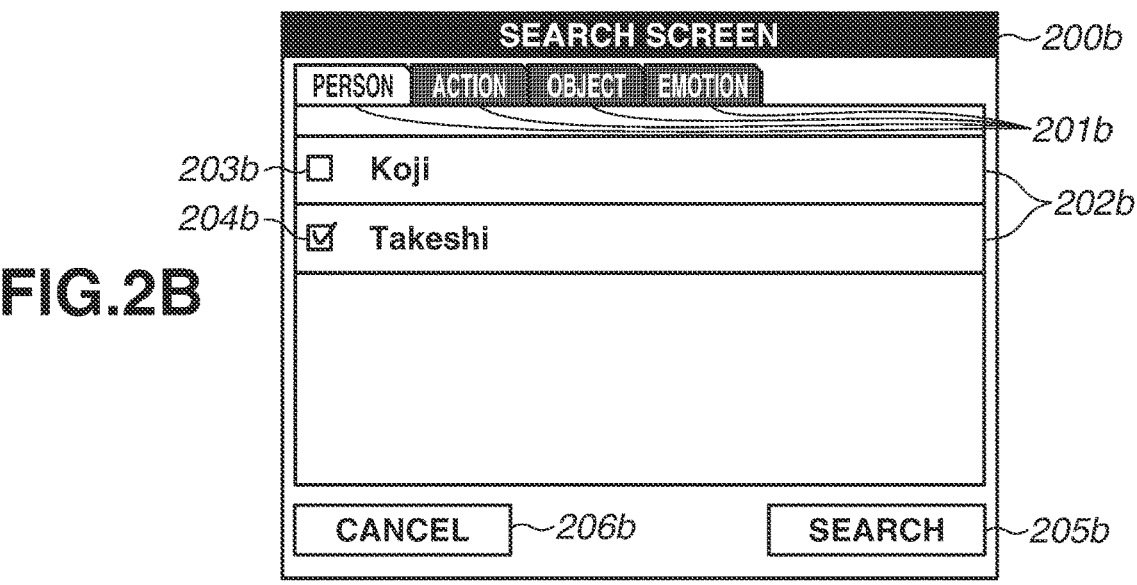
Figure 2C:
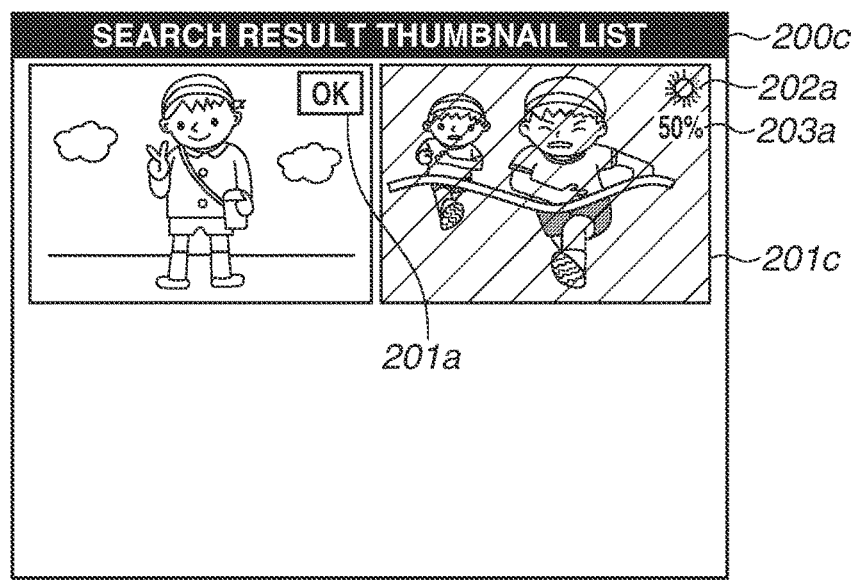

FIGS. 2A, 2B, and 2C illustrate examples of a graphical user interface (GUI) which is displayed on the camera B100 to implement the system in the first exemplary embodiment. In response to an operation performed by the user, the control unit B101 displays each of a thumbnail list screen 200a, a search screen 200b, and a search result screen 200c on the display unit B107.

The thumbnail list screen 200a shows a thumbnail list of captured images which the camera B100 currently stores. When determining, via the operation unit B105, that an instruction for displaying a thumbnail list of captured images has been received, the control unit B101 displays the thumbnail list screen 200a on the display unit B107.

A metadata appending completion indication 201a is an icon indicating that appending of metadata has been completed with respect to an image with the metadata appending completion indication 201a attached thereto.

A metadata appending incompletion indication 202a, which is, for example, a progress indicator, a progress bar, or a ring cursor, is an icon indicating that appending of metadata has not yet been completed with respect to an image with the metadata appending incompletion indication 202a attached thereto.

A metadata appending progress indication 203a, which is, for example, percentage, indicates the progress of appending of metadata with respect to an image with the metadata appending progress indication 203a attached thereto.

The search screen 200b is a screen used to perform an image search for a desired image from captured images which the camera B100 currently stores, with use of pieces of metadata appended to the respective captured images.

Metadata type selection tabs 201b are tabs indicating the types of metadata which are searchable. In the case of the example illustrated in FIG. 2B, the metadata type selection tabs 201b include a tab for a person of the subject, a tab for an action of the subject, a tab for an object of the subject, and a tab for an emotion of the subject. Furthermore, this is merely an example, and other items can be employed. Upon receiving, via the operation unit B105, pressing one of the metadata type selection tabs 201b, the control unit B101 displays metadata selection items 202b corresponding to the pressed tab on the display unit B107.

The metadata selection items 202b indicate items of metadata for use in searching. A metadata non-selection indication 203b indicates that a metadata item for use in search is in a non-selected state. A metadata selection indication 204b indicates that a metadata item for use in search is in a selected state. A search start button 205b is a button used to start a search. A search cancel button 206b is a button used to cancel a search.

The search result screen 200c is a screen used to display a thumbnail list of images matching the search condition as a search result using metadata. When determining, via the operation unit B105, that the search start button 205b has been pressed, the control unit B101 performs a search from the stored captured images and then displays the search result screen 200c on the display unit B107.

The search result screen 200c can also display an image to which appending of metadata is in process, and a metadata appending incompletion indication 201c indicates that appending of metadata to a thumbnail is not yet completed.

<Outline of System>

Figure 3B:
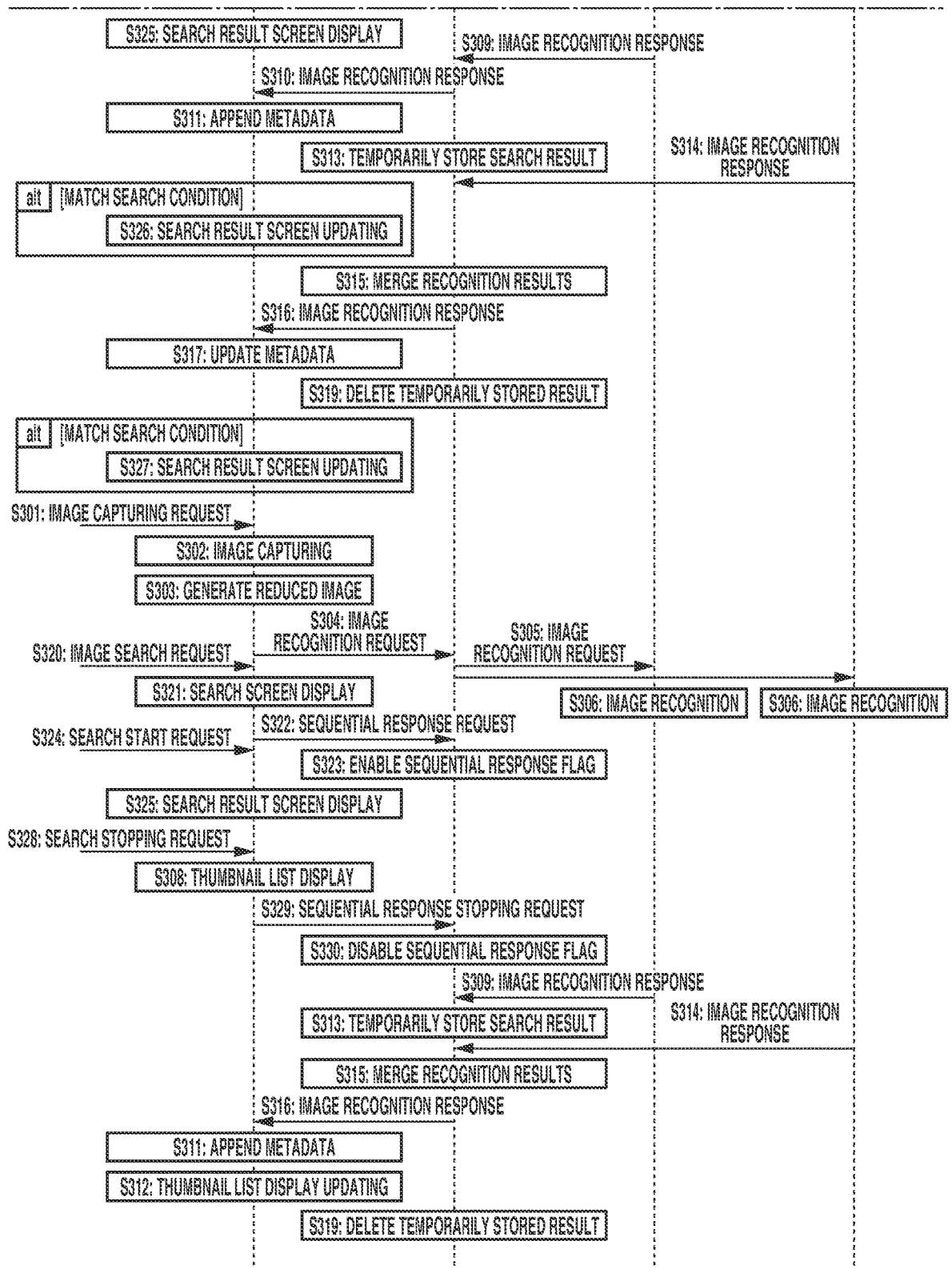
FIG. 3, which is composed of FIGS. 3A and 3B, is a sequence diagram used to explain an outline of a metadata appending procedure which is performed by the intermediate server, the camera, and image recognition servers in the first exemplary embodiment.

A processing sequence of the system in the first exemplary embodiment is described with reference to FIG. 3, which is composed of FIGS. 3A and 3B. An image recognition server C310 and an image recognition server C320 have a configuration similar to that of the image recognition server C100 illustrated in FIG. 1. FIG. 3 illustrates an example of a processing sequence performed in a case where, with respect to respective times until the intermediate server A100 receives respective image recognition results from the image recognition server C310 and the image recognition server C320, the latter time is longer than the former time.

In step S301, the camera B100 receives an image capturing request via the operation unit B105.

In step S302, the camera B100 captures a still image with the image capturing unit B106.

In step S303, the camera B100 generates a reduced image for thumbnail display from the still image captured in step S302.

In step S304, the camera B100 transmits an image recognition request to the intermediate server A100. The camera B100 causes the reduced image generated in step S303 and camera status information (for example, the battery charge remaining amount of the camera B100, user setting information about the camera B100, and information about the operating status of the camera B100) to be included in the image recognition request.

The user setting information, which is information which the user of the camera B100 has set, includes information concerning whether the intermediate server A100 sequentially transmits image recognition responses or collectively transmits image recognition results. For example, in a case where the user of the camera B100 hurries to use metadata, it is conceivable to set the camera in such a way as to cause the intermediate server A100 to sequentially transmit image recognition responses. On the other hand, if image recognition responses are sequentially transmitted, since the number of times of communication between the camera B100 and the intermediate server A100 increases, the power consumption of the camera may increase. Therefore, to reduce the power consumption of the camera, it is also conceivable for the user to set the camera in such a way as to cause the intermediate server A100 to collectively transmit image recognition results. In this way, the user is allowed to designate and switch the transmission method for image recognition responses.

The information about the operating status of the camera includes information indicating whether the camera is in the process of performing an image capturing operation. If image recognition results are sequentially transmitted when the camera is in the process of performing an image capturing operation, since the number of times of communication between the camera B100 and the intermediate server A100 increases, the processing performance for an image capturing operation of the camera B100 may decrease. Accordingly, in a case where the camera B100 is in the process of performing an image capturing operation, it is desirable to set the camera in such a way as to cause the intermediate server A100 to collectively transmit image recognition results. In this way, the user is allowed to switch the method of transmitting image recognition responses according to the operating status of the camera B100.

In step S305, the intermediate server A100 transmits an image recognition request to each of the image recognition server C310 and the image recognition server C320. The intermediate server A100 causes the reduced image received in step S304 to be included in the image recognition request.

In step S306, each of the image recognition server C310 and the image recognition server C320 performs image recognition of, for example, a person, action, object, or emotion included in an image based on the reduced image included in the image recognition request received in step S305.

In step S307, the camera B100 receives a thumbnail list display request for captured images via the operation unit B105.

In step S308, the camera B100 displays the thumbnail list screen 200a on the display unit B107. The camera B100 displays the metadata appending incompletion indication 202a and the metadata appending progress indication 203a in a superimposed manner with respect to the image for which the camera B100 has transmitted the image recognition request in step S304. The metadata appending progress indication 203a at this time indicates 0%.

In step S309, upon completing image recognition requested in step S306, the image recognition server C310 transmits an image recognition response to the intermediate server A100. The image recognition server C310 causes a subject (for example, a person name, an action name, or an object name) and a degree of reliability for each subject to be included in the image recognition response.

Upon receiving the image recognition response in step S309, the intermediate server A100 determines whether the intermediate server A100 sequentially transmits image recognition responses to the camera B100 (hereinafter referred to as "sequential response") or the intermediate server A100 collectively transmits image recognition responses to the camera B100 (hereinafter referred to as "collective response").

The intermediate server A100 determines to perform sequential response in a case which matches any one of the following cases:
  a case where the battery charge remaining amount of the camera included in the image recognition request received in step S304 is greater than a predetermined value;
  a case where the user setting of the camera included in the image recognition request received in step S304 is setting for requesting sequential response;
  a case where information about the operating status of the camera included in the image recognition request received in step S304 is information indicating that the camera is not in the process of performing an image capturing operation;
  a case where the processing load on the intermediate server A100 (for example, CPU or memory usage rate) is lower than a predetermined value; and
  a case where a sequential response flag is currently enabled (details thereof are described below in the description of step S323 and step S330).

On the other hand, the intermediate server A100 determines not to perform sequential response but to perform collective response in a case which matches none of the above-mentioned cases.

In step S310, the intermediate server A100 transmits an image recognition response to the camera B100. The intermediate server A100 causes the subject and the degree of reliability for each subject received in step S309 and metadata appending progress information (indicating, with percentage, the number of image recognition responses returned out of the total number of image recognition requests transmitted in step S305) to be included in the image recognition response. The metadata appending progress information at this time indicates 50%.

In step S311, the camera B100 associates information about the image recognition response received in step S310 (a subject and a degree of reliability for each subject and metadata appending progress information) as metadata with the original captured image captured in step S302 and stores such associated information in the storage unit B104 (i.e., performs metadata appending).

In step S312, the camera B100 updates the thumbnail list screen 200a displayed on the display unit B107 in step S308 according to appending of metadata performed in step S311. The camera B100 updates the value of the metadata appending progress indication 203a included in the thumbnail list screen 200a displayed in step S308 to the value (50%) of metadata appending progress information included in the metadata appended in step S311 and displays the updated thumbnail list screen 200a.

In step S313, the intermediate server A100 temporarily stores information about the image recognition response received in step S309 in the RAM A103.

In step S314, upon completing image recognition performed in step S306, the image recognition server C320 transmits an image recognition response to the intermediate server A100. The image recognition server C320 causes a subject and a degree of reliability for each subject to be included in the image recognition response.

In step S315, the intermediate server A100 integrates (merges) the information temporarily stored in step S313 and information about the image recognition response received in step S314. In a case where the information temporarily stored in step S313 and information about the image recognition response received in step S314 differ in subject, the intermediate server A100 sets the logical sum of those pieces of information as a merge result. For example, in a case where the information temporarily stored in step S313 is "Koji" (degree of reliability=85%) and the information received in step S314 is "Takeshi" (degree of reliability=60%), the intermediate server A100 sets "Koji (degree of reliability=85%) and Takeshi (degree of reliability=60%)" as a merge result. In a case where the information temporarily stored in step S313 and information about the image recognition response received in step S314 equal in subject and differ in degree of reliability, the intermediate server A100 sets the average value of the subjects and degrees of reliability of the respective pieces of information as a merge result. For example, in a case where the information temporarily stored in step S313 is "Koji" (degree of reliability=85%) and the information received in step S314 is "Koji" (degree of reliability=90%), the intermediate server A100 sets "Koji (degree of reliability=87.5%)" as a merge result.

In step S316, the intermediate server A100 transmits an image recognition response to the camera B100. The intermediate server A100 causes subjects and degrees of reliability for each subject included in the information merged in step S315 and metadata appending progress information to be included in the image recognition response. The metadata appending progress information at this time is 100%.

In step S317, the camera B100 associates information about the image recognition response received in step S315 (subjects and degrees of reliability for each subject and metadata appending progress information) as metadata of subject information with the original captured image captured in step S302 and stores the associated information in the storage unit B104 (i.e., performs metadata updating).

In step S318, in response to metadata updating performed in step S317, the camera B100 updates the thumbnail list screen 200a displayed on the display unit B107 in step S308. Since the metadata appending progress information included in the metadata updated in step S317 is 100%, the camera B100 deletes the metadata appending incompletion indication 202a and the metadata appending progress indication 203a included in the thumbnail list screen 200a displayed in step S308, and displays the metadata appending completion indication 201a in a superimposed manner.

In step S319, the intermediate server A100 deletes the information temporarily stored in step S313.

Next, a case where the camera B100 has received a search start request is described. Furthermore, processing operations similar to those described above are assigned the respective same reference characters and the description thereof is not repeated.

In step S320, the camera B100 receives a search request via the operation unit B105.

In step S321, the camera B100 displays the search screen 200b on the display unit B107.

In step S322, the camera B100 transmits a sequential response request to the intermediate server A100.

In step S323, the intermediate server A100 enables a sequential response flag and stores the enabled sequential response flag in the RAM A103.

In step S324, the camera B100 receives a search start request via the operation unit B105. The camera B100 determines, via the operation unit B105, the search start button 205b being pressed as a search start request.

In step S325, the camera B100 searches for images associated with a metadata item selected in step S324 from the storage unit B104 and displays the found images as the search result screen 200c on the display unit B107.

In step S326, in a case where a subject included in the metadata appended in step S311 matches the metadata selected as a search condition in step S324, the camera B100 updates the search result screen 200c. The camera B100 adds and displays the original image captured in step S302 to the search result screen 200c and also displays the metadata appending incompletion indication 202a and the metadata appending progress indication 203a in a superimposed manner. The metadata appending progress indication 203a at this time indicates 50%.

In step S327, in a case where a subject included in the metadata updated in step S317 matches the metadata selected as a search condition in step S324, the camera B100 updates the search result screen 200c. Since the metadata appending progress information included in the metadata updated in step S317 is 100%, the camera B100 deletes the metadata appending incompletion indication 202a and the metadata appending progress indication 203a included in the search result screen 200c displayed in step S326, and displays the metadata appending completion indication 201a in a superimposed manner.

Next, a case where, after receiving a search start request, the camera B100 has received a search stopping operation is described. Furthermore, processing operations similar to those described above are assigned the respective same reference characters and the description thereof is not repeated.

In step S328, the camera B100 receives a search stopping request via the operation unit B105. The camera B100 determines, via the operation unit B105, the search cancel button 206b being pressed as a search stopping request.

In step S329, the camera B100 transmits a sequential response stopping request to the intermediate server A100.

In step S330, the intermediate server A100 disables the sequential response flag and stores the disabled sequential response flag in the RAM A103.

As described above, the intermediate server A100 in the first exemplary embodiment switches whether to sequentially append pieces of metadata or to, after receiving all of the recognition results, integrate and append pieces of metadata, according to the setting performed by the user or the status of the apparatus. With this configuration, in a case where the processing load on each apparatus is low or the user hurries to use metadata, it is possible to prioritize a reduction in the time taken until metadata becomes usable, and, otherwise, it is possible to prioritize a reduction in the processing load on each apparatus.

<Operation of Each Apparatus>

Details of respective operations of the intermediate server A100 and the camera B100 which are performed to implement the above-described operation are described with reference to FIG. 4 and FIG. 5.

Figure 4:
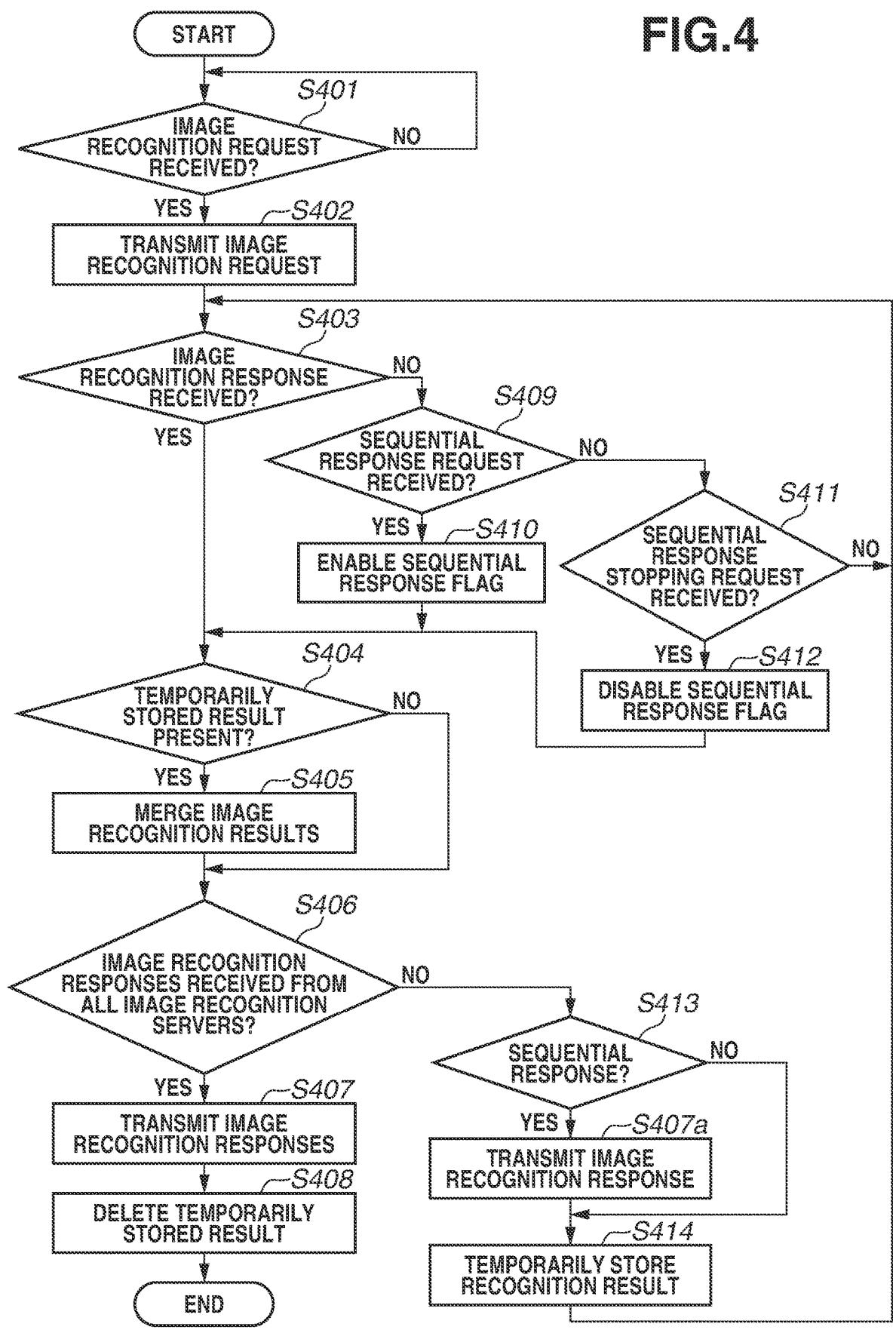
FIG. 4 is a flowchart illustrating an operation of the intermediate server in the first exemplary embodiment.

FIG. 4 is a flowchart illustrating an operation of the intermediate server A100 in the first exemplary embodiment. Furthermore, processing illustrated in the present flowchart is implemented by the control unit A101 controlling each unit of the intermediate server A100 according to input signals and programs.

In step S401, the control unit A101 determines whether an image recognition request has been received from the camera B100 via the communication unit A106. If it is determined that the image recognition request has been received (YES in step S401), the control unit A101 advances the processing to step S402, and, if not so (NO in step S401), the control unit A101 repeats processing in step S401.

In step S402, the control unit A101 transmits an image recognition request to one or more image recognition servers C100 via the communication unit A106. The control unit A101 causes a reduced image received in step S401 to be included in the image recognition request. The present step is equivalent to the processing in step S305 illustrated in FIG. 3.

In step S403, the control unit A101 determines whether an image recognition response has been received from the image recognition server C100 via the communication unit A106. If it is determined that the image recognition response has been received (YES in step S403), the control unit A101 advances the processing to step S404, and, if not so (NO in step S403), the control unit A101 advances the processing to step S409.

In step S404, the control unit A101 determines whether an image recognition response stored in step S414 described below is present. If it is determined that the image recognition response is present (YES in step S404), the control unit A101 advances the processing to step S405, and, if not so (NO in step S404), the control unit A101 advances the processing to step S406.

In step S405, the control unit A101 integrates (merges) information temporarily stored in step S414 described below and information about the image recognition response received in step S403. In a case where the information temporarily stored in step S414 and information about the image recognition response received in step S403 differ in subject, the control unit A101 sets the logical sum of those pieces of information as a merge result. For example, in a case where the information temporarily stored in step S414 is "Koji" (degree of reliability=85%) and the information received in step S403 is "Takeshi" (degree of reliability=60%), the control unit A101 sets "Koji (degree of reliability=85%) and Takeshi (degree of reliability=60%)"

as a merge result. In a case where the information temporarily stored in step S414 and information about the image recognition response received in step S403 equal in subject and differ in degree of reliability, the control unit A101 sets the average value of the subjects and degrees of reliability of the respective pieces of information as a merge result. For example, in a case where the information temporarily stored in step S414 is "Koji" (degree of reliability=85%) and the information received in step S403 is "Koji" (degree of reliability=90%), the control unit A101 sets "Koji (degree of reliability=87.5%)" as a merge result. The present step is equivalent to the processing in step S315 illustrated in FIG. 3.

In step S406, the control unit A101 determines whether image recognition responses have been received from all of the image recognition servers C100 in step S403. If it is determined that image recognition responses have been received from all of the image recognition servers C100 in step S403 (YES in step S406), the control unit A101 advances the processing to step S407, and, if not so (NO in step S406), the control unit A101 advances the processing to step S413.

In step S407, the control unit A101 transmits the image recognition responses to the camera B100 via the communication unit A106. The control unit A101 causes information about the image recognition response received in step S403 or the information merged in step S405 to be included in each of the image recognition responses. The present step is equivalent to the processing in step S310 and step S316 illustrated in FIG. 3.

In step S408, the control unit A101 deletes information temporarily stored in the RAM A103 in step S414 described below. The present step is equivalent to the processing in step S319 illustrated in FIG. 3.

In step S409, the control unit A101 determines whether a sequential response request has been received from the camera B100 via the communication unit A106. If it is determined that the sequential response request has been received (YES in step S409), the control unit A101 advances the processing to step S410, and, if not so (NO in step S409), the control unit A101 advances the processing to step S411.

In step S410, the control unit A101 enables a sequential response flag and stores the enabled sequential response flag in the RAM A103. The present step is equivalent to the processing in step S323 illustrated in FIG. 3.

In step S411, the control unit A101 determines whether a sequential response stopping request has been received from the camera B100 via the communication unit A106. If it is determined that the sequential response stopping request has been received (YES in step S411), the control unit A101 advances the processing to step S412, and, if not so (NO in step S411), the control unit A101 returns the processing to step S403.

In step S412, the control unit A101 disables a sequential response flag and stores the disabled sequential response flag in the RAM A103. The present step is equivalent to the processing in step S330 illustrated in FIG. 3.

In step S413, the control unit A101 determines whether to perform sequential response or perform collective response to the camera B100 via the communication unit A106. If it is determined to perform sequential response (YES in step S413), the control unit A101 advances the processing to step S407a, and, if not so (NO in step S413), the control unit A101 advances the processing to step S414. In step S407a, the control unit A101 transmits the image recognition response to the camera B100 via the communication unit A106. The control unit A101 causes information about the image recognition response received in step S403 or the information merged in step S405 to be included in the image recognition response. The present step is equivalent to the processing in step S310 and step S316 illustrated in FIG. 3. The control unit A101 determines to perform sequential response in a case which matches any one of the following cases:

a case where the battery charge remaining amount of the camera included in the image recognition request received in step S401 is greater than a predetermined value;

a case where the user setting of the camera included in the image recognition request received in step S401 is setting for requesting sequential response;

a case where information about the operating status of the camera included in the image recognition request received in step S401 is information indicating that the camera is not in the process of performing an image capturing operation;

a case where the processing load on the intermediate server A100 (for example, CPU or memory usage rate) is lower than a predetermined value; and a case where the sequential response flag is currently enabled.

On the other hand, the control unit A101 determines not to perform sequential response but to perform collective response in a case which matches none of the above-mentioned cases. In step S414, the control unit A101 temporarily stores information about the image recognition response received in step S403 or the information merged in step S405 in the RAM A103. The present step is equivalent to the processing in step S313 illustrated in FIG. 3.

Thus far is the description of the flowchart illustrating an operation of the intermediate server A100 in the first exemplary embodiment.

As described above, the intermediate server A100 in the first exemplary embodiment switches whether to sequentially append pieces of metadata or to, after receiving all of the recognition results, integrate and append pieces of metadata, according to the setting performed by the user or the status of the apparatus. With this configuration, in a case where the processing load on each apparatus is low or the user hurries to use metadata, it is possible to prioritize a reduction in the time taken until metadata becomes usable, and, otherwise, it is possible to prioritize a reduction in the processing load on each apparatus.

Figure 5:
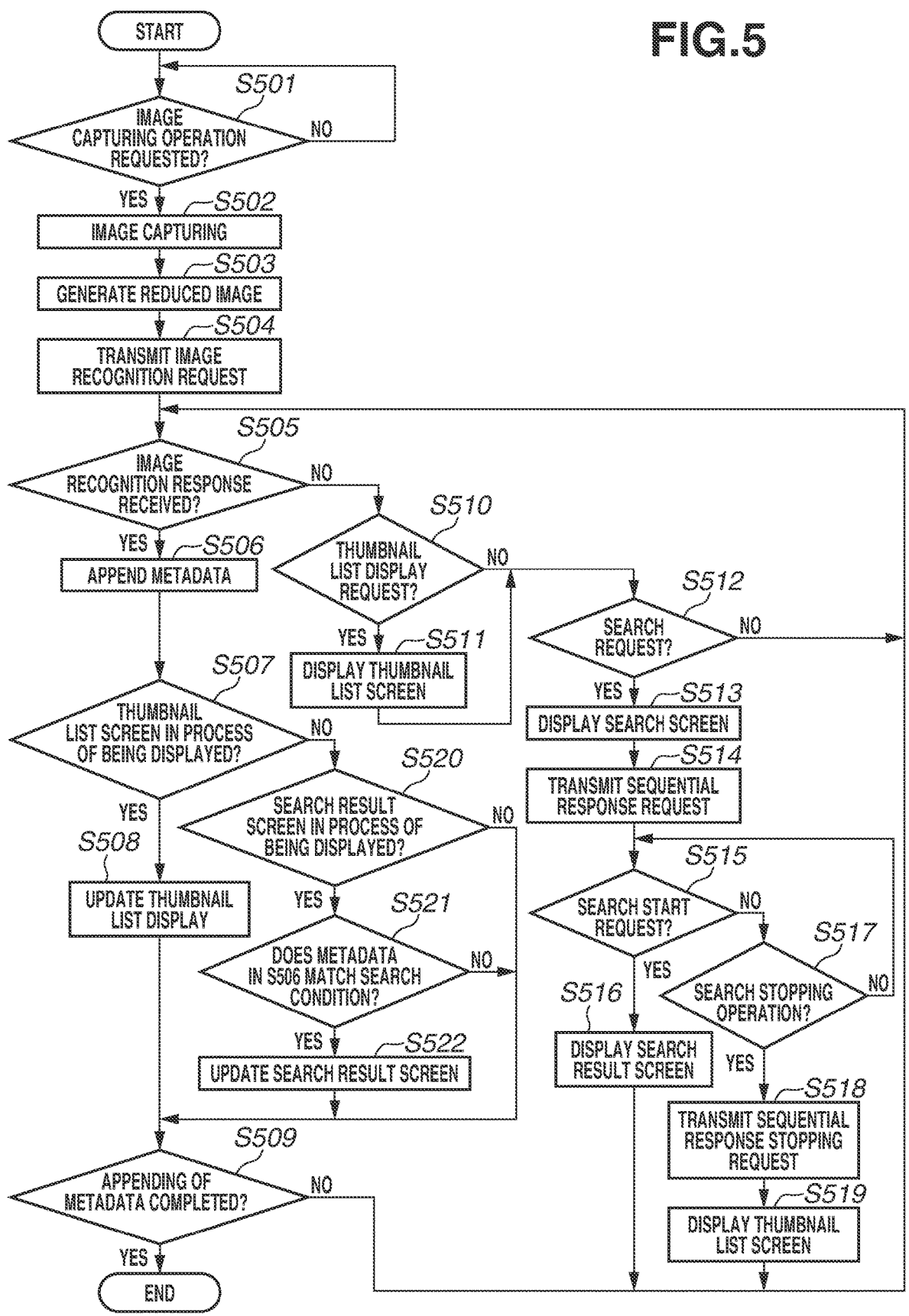
FIG. 5 is a flowchart illustrating an operation of the camera in the first exemplary embodiment.

FIG. 5 is a flowchart illustrating an operation of the camera B100 in the first exemplary embodiment. Furthermore, processing illustrated in the present flowchart is implemented by the control unit B101 of the camera B100 controlling each unit of the camera B100 according to input signals and programs.

In step S501, the control unit B101 determines whether an image capturing operation has been received via the operation unit B105. If it is determined that the image capturing operation has been received (YES in step S501), the control unit B101 advances the processing to step S502, and, if not so (NO in step S501), the control unit B101 repeats processing in step S501.

In step S502, the control unit B101 captures a still image with the image capturing unit B106. The present step is equivalent to the processing in step S302 illustrated in FIG. 3.

In step S503, the control unit B101 generates a reduced image from image data obtained by the image capturing processing. The present step is equivalent to the processing in step S303 illustrated in FIG. 3.

In step S504, the control unit B101 transmits an image recognition request to the intermediate server A100 via the communication unit B108. The control unit B101 causes the reduced image generated in step S503 and camera status information to be included in the image recognition request. The present step is equivalent to the processing in step S304 illustrated in FIG. 3.

In step S505, the control unit B101 determines whether an image recognition response has been received from the intermediate server A100 via the communication unit B108. If it is determined that the image recognition response has been received (YES in step S505), the control unit B101 advances the processing to step S506, and, if not so (NO in step S505), the control unit B101 advances the processing to step S510.

In step S506, the control unit B101 associates information about the image recognition response received in step S505 (a subject and a degree of reliability for each subject and metadata appending progress information) as metadata with the original captured image captured in step S502 and stores such associated information in the storage unit B104. The present step is equivalent to the processing in step S311 and step S317 illustrated in FIG. 3.

In step S507, the control unit B101 determines whether the thumbnail list screen 200a is in the process of being displayed on the display unit B107. If it is determined that the thumbnail list screen 200a is in the process of being displayed on the display unit B107 (YES in step S507), the control unit B101 advances the processing to step S508, and, if not so (NO in step S507), the control unit B101 advances the processing to step S520.

In step S508, the control unit B101 updates the thumbnail list screen 200a displayed on the display unit B107. In a case where the metadata appending progress information included in the metadata appended in step S506 is 100%, the control unit B101 deletes the metadata appending incompletion indication 202a and the metadata appending progress indication 203a included in the thumbnail list screen 200a, and displays the metadata appending completion indication 201a in a superimposed manner. In a case where the metadata appending progress information included in the metadata appended in step S506 is not 100%, the control unit B101 updates the value of the metadata appending progress indication 203a included in the thumbnail list screen 200a to the value of the metadata appending progress information and displays the updated thumbnail list screen 200a. The present step is equivalent to the processing in step S318 illustrated in FIG. 3.

In step S509, the control unit B101 determines whether appending of metadata to the original captured image captured in step S502 has been completed. The control unit B101 determines that appending of metadata has been completed when the metadata appending progress information included in the metadata appended in step S506 indicates 100%. If it is determined that appending of metadata has been completed (YES in step S509), the control unit B101 ends the processing, and, if not so (NO in step S509), the control unit B101 returns the processing to step S505.

In step S510, the control unit B101 determines whether a thumbnail list display request has been received via the operation unit B105. If it is determined that the thumbnail list display request has been received via the operation unit B105 (YES in step S510), the control unit B101 advances the processing to step S511, and, if not so (NO in step S510), the control unit B101 advances the processing to step S512.

In step S511, the control unit B101 displays the thumbnail list screen 200a on the display unit B107. The present step is equivalent to the processing in step S308 illustrated in FIG. 3.

In step S512, the control unit B101 determines whether a search request for an image including a subject set as a search condition has been received via the operation unit B105. If it is determined that the image search request has been received via the operation unit B105 (YES in step S512), the control unit B101 advances the processing to step S513, and, if not so (NO in step S512), the control unit B101 returns the processing to step S505.

In step S513, the control unit B101 displays the search screen 200b on the display unit B107. The present step is equivalent to the processing in step S321 illustrated in FIG. 3.

In step S514, the control unit B101 transmits a sequential response request to the intermediate server A100 via the communication unit B108. The present step is equivalent to the processing in step S322 illustrated in FIG. 3.

In step S515, the control unit B101 determines whether a search start request has been received via the operation unit B105. If it is determined that the search start request has been received via the operation unit B105 (YES in step S515), the control unit B101 advances the processing to step S516, and, if not so (NO in step S515), the control unit B101 advances the processing to step S517. The control unit B101 determines the search start button 205b being pressed via the operation unit B105 as a search start request.

In step S516, the control unit B101 searches for images associated with a metadata item selected in step S515 from the storage unit B104 and displays the search result screen 200c including the found images on the display unit B107. The present step is equivalent to the processing in step S325 illustrated in FIG. 3.

In step S517, the control unit B101 determines whether a search stopping request has been received via the operation unit B105. If it is determined that the search stopping request has been received via the operation unit B105 (YES in step S517), the control unit B101 advances the processing to step S518, and, if not so (NO in step S517), the control unit B101 returns the processing to step S515. The control unit B101 determines the search cancel button 206b being pressed via the operation unit B105 as a search stopping request.

In step S518, the control unit B101 transmits a sequential response stopping request to the intermediate server A100 via the communication unit B108. The present step is equivalent to the processing in step S329 illustrated in FIG. 3.

In step S519, the control unit B101 displays the thumbnail list screen 200a on the display unit B107. The present step is equivalent to the processing in step S308 illustrated in FIG. 3.

In step S520, the control unit B101 determines whether the search result screen 200c is in the process of being displayed on the display unit B107. If it is determined that the search result screen 200c is in the process of being displayed on the display unit B107 (YES in step S520), the control unit B101 advances the processing to step S521, and, if not so (NO in step S520), the control unit B101 advances the processing to step S509.

In step S521, the control unit B101 determines whether a subject included in the metadata appended in step S506 matches a metadata item selected as a search condition in step S515. If it is determined that the subject included in the metadata matches the search condition (YES in step S521), the control unit B101 advances the processing to step S522, and, if not so (NO in step S521), the control unit B101 advances the processing to step S509.

In step S522, the control unit B101 updates the search result screen 200c, which is in the process of being displayed on the display unit B107. In a case where the original image captured in step S502 is not displayed in the search result screen 200c, the control unit B101 adds such an original image to the search result screen 200c and displays the thus-updated search result screen 200c. At this time, in a case where metadata appending progress information included in the metadata appended in step S506 does not indicate 100%, the control unit B101 superimposes and displays the metadata appending incompletion indication 202a, the metadata appending progress indication 203a, and the metadata appending incompletion indication 201c on the original image captured in step S502. On the other hand, in a case where the metadata appending progress information indicates 100%, the control unit B101 deletes the metadata appending incompletion indication 202a and the metadata appending progress indication 203a and displays the metadata appending completion indication 201a in a superimposed manner. The present step is equivalent to the processing in step S326 and step S327 illustrated in FIG. 3.

Thus far is the description of the flowchart illustrating an operation of the camera B100 in the first exemplary embodiment.

As described above, the camera B100 in the first exemplary embodiment transmits information required to determine whether to perform sequential response or perform collective response to the intermediate server A100. This enables the intermediate server A100 to appropriately determine whether to perform sequential response or perform collective response.

In the above-described first exemplary embodiment, a system including a camera, an intermediate server, and an image recognition server has been described. In a second exemplary embodiment, a system including a camera, which is an information processing apparatus, and an image recognition server, which provides a cloud service for image recognition, is described. Furthermore, in the second exemplary embodiment, only differences from the first exemplary embodiment are described in detail, and the contents similar to those in the first exemplary embodiment are omitted from description here.

<System Configuration>

Figure 6:
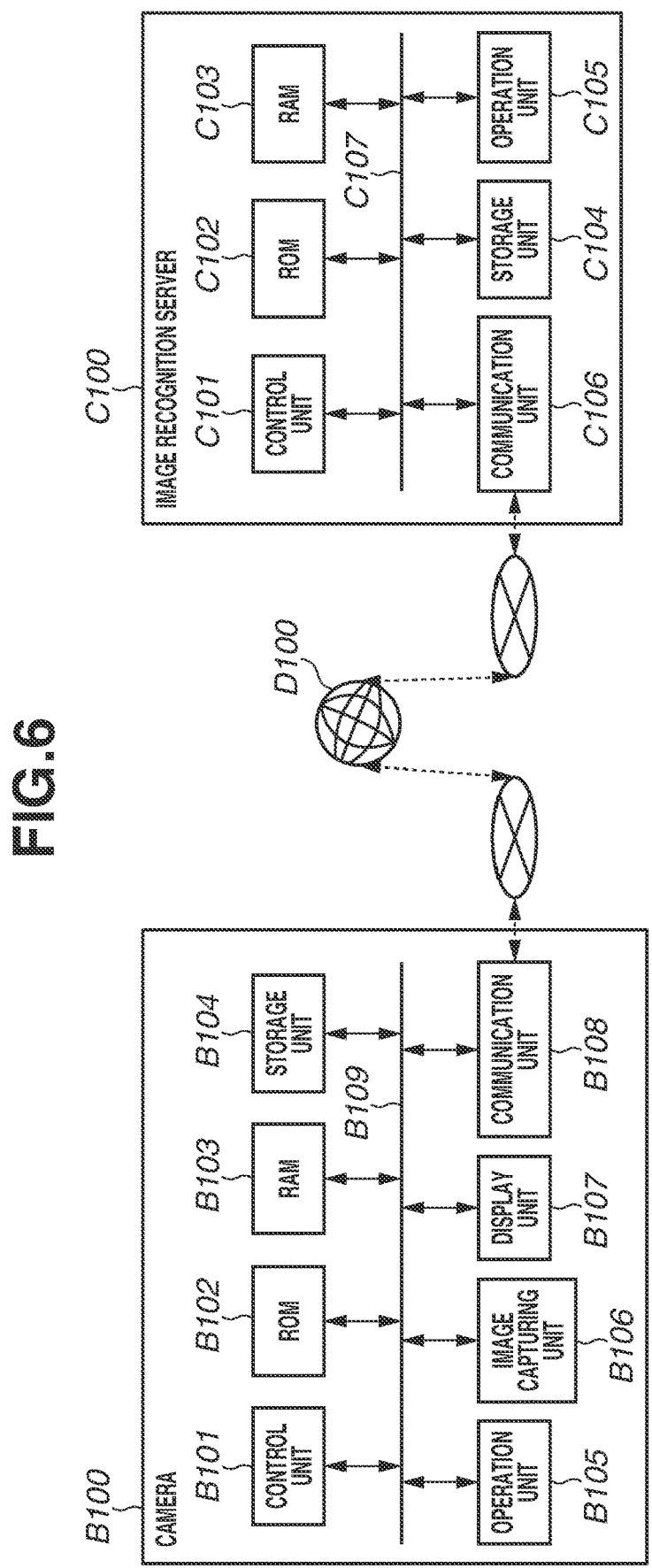
FIG. 6 is a set of respective block diagrams of a camera and an image recognition server in a second exemplary embodiment.

FIG. 6 is a set of block diagrams illustrating a configuration of the entire system in the second exemplary embodiment. The system in the second exemplary embodiment includes a camera B100, an image recognition server C100, and the Internet D100. While, in the second exemplary embodiment, only one image recognition server is illustrated, there can be two or more image recognition servers which communicate with the camera B100.

The control unit B101 determines whether to sequentially perform appending of metadata based on image recognition results received from the image recognition server C100 or merge image recognition results received from the image recognition server C100 and then perform appending of metadata, according to a predetermined condition. The communication unit B108 implements communication with one or more image recognition servers C100 via the Internet D100. Moreover, the communication unit C106 also performs communication with the camera B100 via the Internet D100.

<Outline of System>

Figure 7B:
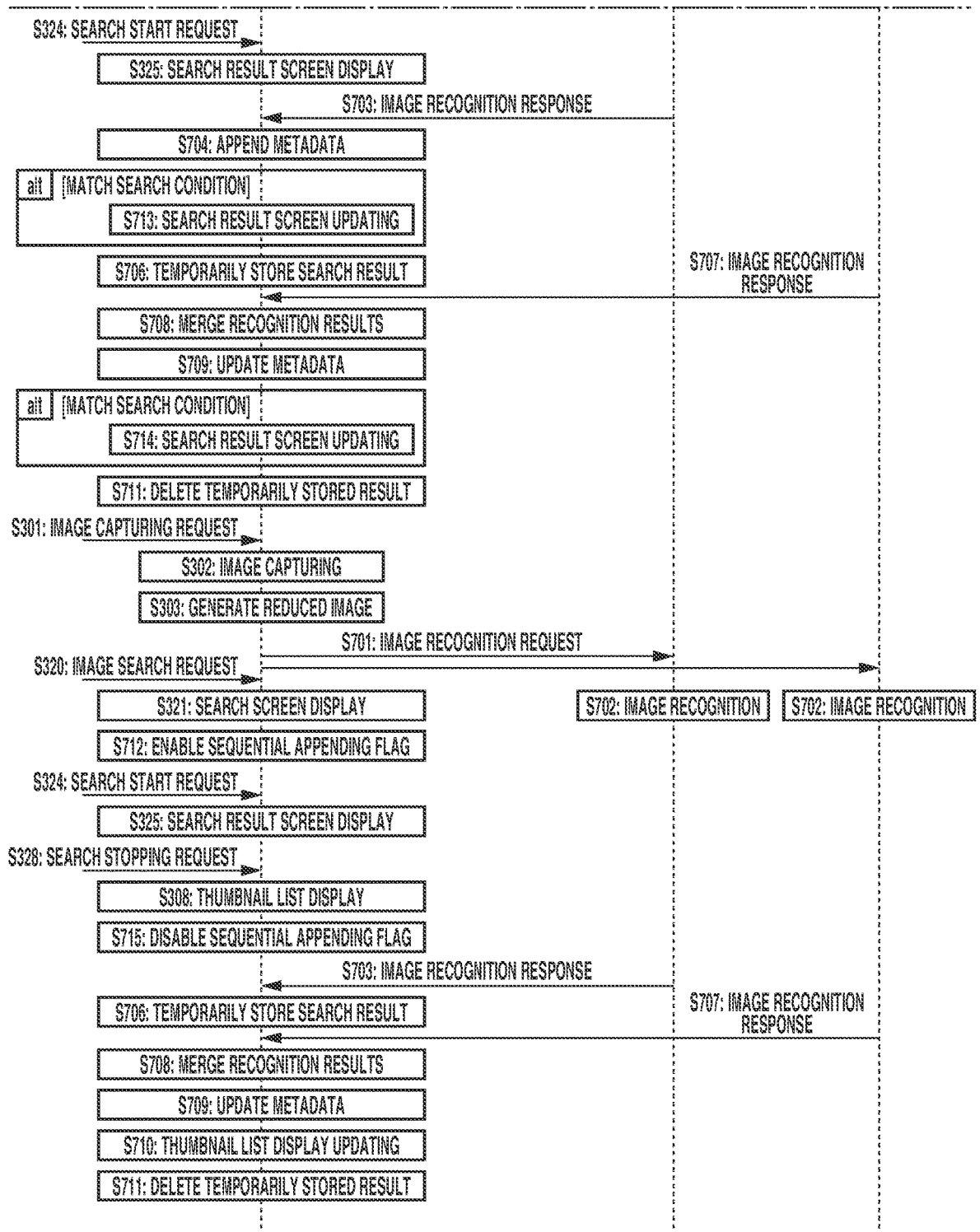
FIG. 7, which is composed of FIGS. 7A and 7B, is a sequence diagram used to explain an outline of a metadata appending procedure which is performed by the camera and image recognition servers in the second exemplary embodiment.

A processing sequence for the processing in the second exemplary embodiment is described with reference to FIG. 7, which is composed of FIGS. 7A and 7B. Processing operations similar to those in the first exemplary embodiment are omitted from description here.

In step S701, the camera B100 transmits an image recognition request to each of the image recognition server C310 and the image recognition server C320. The camera B100 causes a reduced image generated in step S303 to be included in the image recognition request.

In step S702, each of the image recognition server C310 and the image recognition server C320 performs image recognition of, for example, a person, action, object, or emotion based on the reduced image included in the image recognition request received in step S701.

In step S703, upon completing image recognition requested in step S702, the image recognition server C310 transmits an image recognition response to the camera B100. The image recognition server C310 causes a subject and a degree of reliability for each subject to be included in the image recognition response.

Upon receiving the image recognition response in step S703, the camera B100 determines whether to sequentially append pieces of metadata (hereinafter referred to as "sequential appending") or append pieces of metadata after integrating image recognition results (hereinafter referred to as "collective appending"). The camera B100 determines to perform sequential appending in a case which matches any one of the following cases:

a case where the battery charge remaining amount of the camera B100 is greater than a predetermined value;

a case where the user setting of the camera B100 is setting for requesting sequential appending;

a case where the processing load on the camera B100 (for example, CPU or memory usage rate) is lower than a predetermined value;

a case where the camera B100 is not in the process of performing an image capturing operation; and a case where a sequential appending flag is currently enabled (details thereof are described below in the description of step S712 and step S715).

On the other hand, the camera B100 determines not to perform sequential appending (i.e., determines to perform collective appending) in a case which matches none of the above-mentioned cases.

In step S704, the camera B100 associates information about the image recognition response received in step S703 and metadata appending progress information (indicating, with percentage, the number of image recognition responses returned out of the total number of image recognition requests transmitted in step S701) as metadata with the original image captured in step S302 and stores such associated information in the storage unit B104 (i.e., performs metadata appending).

In step S705, the camera B100 updates the thumbnail list screen 200a displayed on the display unit B107 in step S308 according to appending of metadata performed in step S704. The camera B100 updates the value of the metadata appending progress indication 203a included in the thumbnail list screen 200a displayed in step S308 to the value (50%) of metadata appending progress information included in the metadata appended in step S704 and displays the updated thumbnail list screen 200a.

In step S706, the camera B100 temporarily stores information about the image recognition response received in step S703 in the RAM B103.

In step S707, upon completing image recognition performed in step S702, the image recognition server C320 transmits an image recognition response to the camera B100. The image recognition server C320 causes a subject and a degree of reliability for each subject to be included in the image recognition response.

In step S708, the camera B100 merges the information temporarily stored in step S706 and information about the image recognition response received in step S707. An example of such merging is similar to that in the first exemplary embodiment and is, therefore, omitted from description here.

In step S709, the camera B100 associates information merged in step S708 as metadata of subject information with the original image captured in step S302 and stores the associated information in the storage unit B104 (i.e., performs metadata updating).

In step S710, in response to metadata updating performed in step S709, the camera B100 updates the thumbnail list screen 200a displayed on the display unit B107 in step S308. Since the metadata appending progress information included in the metadata updated in step S709 is 100%, the camera B100 deletes the metadata appending incompletion indication 202a and the metadata appending progress indication 203a included in the thumbnail list screen 200a displayed in step S308, and displays the metadata appending completion indication 201a in a superimposed manner.

In step S711, the camera B100 deletes the information temporarily stored in step S706.

Next, a case where the camera B100 has received a search start request is described. Furthermore, processing operations similar to those described above are assigned the respective same reference characters and the description thereof is not repeated.

In step S712, the camera B100 enables a sequential appending flag and stores the enabled sequential appending flag in the RAM B103.

In step S713, in a case where a subject included in the metadata appended in step S311 matches the metadata item selected as a search condition in step S324, the camera B100 updates the search result screen 200c. The camera B100 adds and displays the original image captured in step S302 to the search result screen 200c and also displays the metadata appending incompletion indication 202a and the metadata appending progress indication 203a in a superimposed manner. The metadata appending progress indication 203a at this time indicates 50%.

In step S714, in a case where a subject included in the metadata updated in step S709 matches the metadata item selected as a search condition in step S324, the camera B100 updates the search result screen 200c. Since the metadata appending progress information included in the metadata updated in step S709 is 100%, the camera B100 deletes the metadata appending incompletion indication 202a and the metadata appending progress indication 203a included in the search result screen 200c displayed in step S713, and displays the metadata appending completion indication 201a in a superimposed manner.

Next, a case where, after receiving a search start request, the camera B100 has received a search stopping operation is described. Furthermore, processing operations similar to those described above are assigned the respective same reference characters and the description thereof is not repeated.

In step S715, the camera B100 disables the sequential appending flag and stores the disabled sequential appending flag in the RAM B103.

As described above, the camera B100 in the second exemplary embodiment switches whether to sequentially append pieces of metadata or to, after receiving all of the recognition results, append pieces of metadata, according to the setting performed by the user or the status of the apparatus. With this configuration, in a case where the processing load on the camera B100 is low or the user hurries to use metadata, it is possible to prioritize a reduction in the time taken until metadata becomes usable, and, otherwise, it is possible to prioritize a reduction in the processing load on the camera B100.

<Operation of Each Apparatus>

Figure 8B:
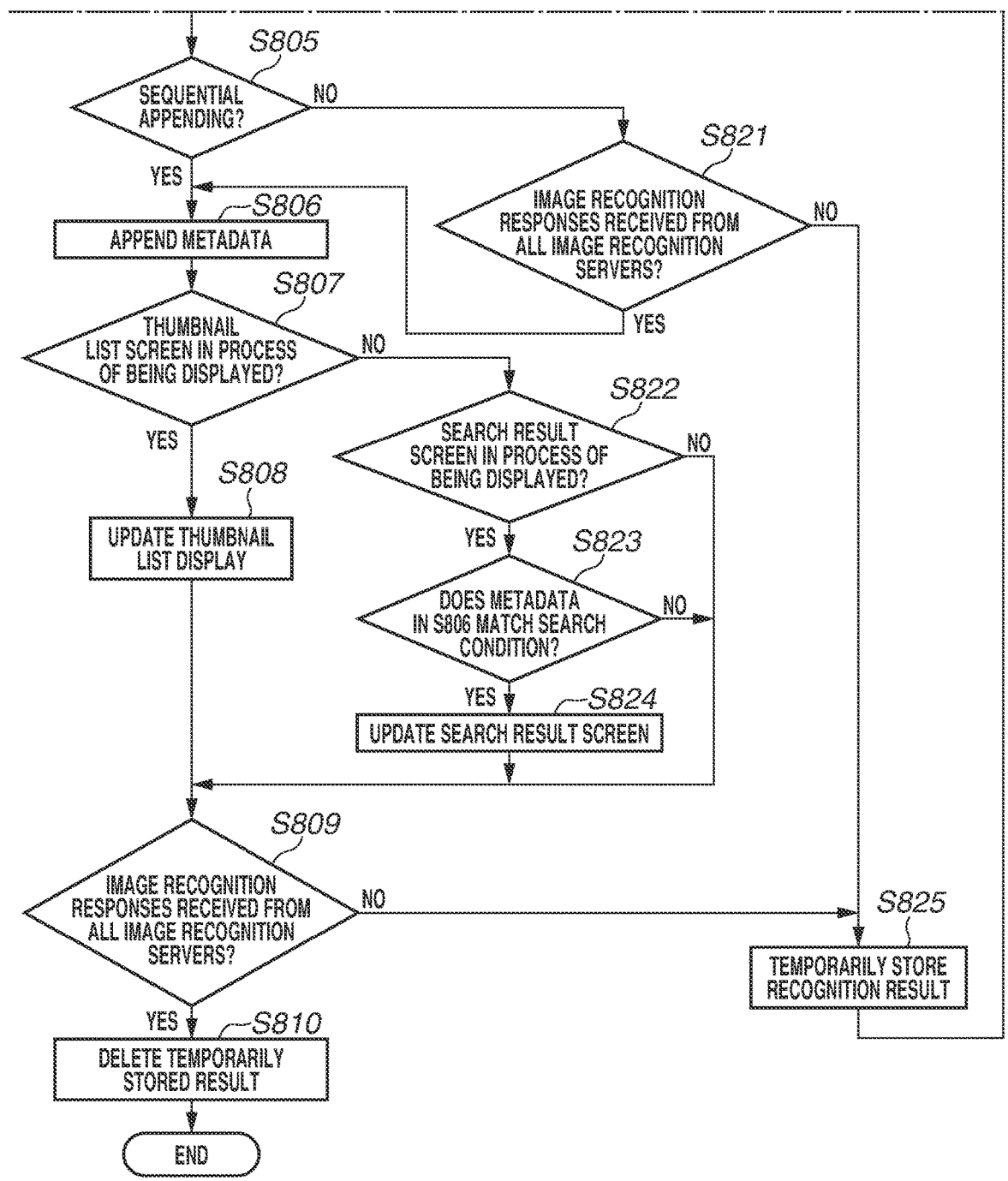
FIG. 8, which is composed of FIGS. 8A and 8B, is a flowchart illustrating an operation of the camera in the second exemplary embodiment.

FIG. 8, which is composed of FIGS. 8A and 8B, is a flowchart illustrating an operation of the camera B100 in the second exemplary embodiment. Furthermore, processing illustrated in the present flowchart is implemented by the control unit B101 of the camera B100 controlling each unit of the camera B100 according to input signals and programs.

In step S801, the control unit B101 transmits an image recognition request to each of the image recognition server C310 and the image recognition server C320 via the communication unit B108. The control unit B101 causes a reduced image generated in step S503 to be included in the image recognition request. The present step is equivalent to the processing in step S701 illustrated in FIG. 7.

In step S802, the control unit B101 determines whether image recognition results have been received from the image recognition server C310 and the image recognition server C320 via the communication unit B108. If it is determined that the image recognition results have been received via the communication unit B108 (YES in step S802), the control unit B101 advances the processing to step S803, and, if not so (NO in step S802), the control unit B101 advances the processing to step S811.

In step S803, the control unit B101 determines whether an image recognition response stored in step S825 described below is present. If it is determined that the image recognition response stored in step S825 is present (YES in step S803), the control unit B101 advances the processing to step S804, and, if not so (NO in step S803), the control unit B101 advances the processing to step S805.

In step S804, the control unit B101 merges the image recognition response stored in step S825 described below and the image recognition responses received in step S802. An example of such merging is similar to that in step S405 and is, therefore, omitted from description here. The present step is equivalent to the processing in step S708 illustrated in FIG. 7.

In step S805, the control unit B101 determines whether to perform sequential appending or perform collective appending. If it is determined to perform sequential appending (YES in step S805), the control unit B101 advances the processing to step S806, and, if not so (NO in step S805), the control unit B101 advances the processing to step S821. The camera B100 determines to perform sequential appending in a case which matches any one of the following cases:

- a case where the battery charge remaining amount of the camera B100 is greater than a predetermined value;
- a case where the user setting of the camera B100 is setting for requesting sequential appending;
- a case where the processing load on the camera B100 (for example, CPU or memory usage rate) is lower than a predetermined value;
- a case where the camera B100 is not in the process of performing an image capturing operation; and
- a case where a sequential appending flag is currently enabled (details thereof are described below in the description of step S815 and step S819).

On the other hand, the camera B100 determines not to perform sequential appending (i.e., determines to perform collective appending) in a case which matches none of the above-mentioned cases.

In step S806, in the case of the processing in step S804 being performed, the control unit B101 associates the image recognition response merged in step S804 as metadata with the original image captured in step S502 and stores the associated metadata in the storage unit B104 (i.e., performs metadata updating), and, in the case of the processing in step S804 not being performed, the control unit B101 associates the image recognition response received in step S802 as metadata with the original image captured in step S502 and stores the associated metadata in the storage unit B104 (i.e., performs metadata appending). The present step is equivalent to the processing in step S704 and S709 illustrated in FIG. 7.

In step S807, the control unit B101 determines whether the thumbnail list screen 200a is in the process of being displayed on the display unit B107. If it is determined that the thumbnail list screen 200a is in the process of being displayed on the display unit B107 (YES in step S807), the control unit B101 advances the processing to step S808, and, if not so (NO in step S807), the control unit B101 advances the processing to step S822.

In step S808, the control unit B101 updates the thumbnail list screen 200a displayed on the display unit B107. In a case where the metadata appending progress information included in the metadata appended in step S806 is 100%, the control unit B101 deletes the metadata appending incompletion indication 202a and the metadata appending progress indication 203a included in the thumbnail list screen 200a, and displays the metadata appending completion indication 201a in a superimposed manner. In a case where the metadata appending progress information included in the metadata appended in step S806 is not 100%, the control unit B101 updates the value of the metadata appending progress indication 203a included in the thumbnail list screen 200a to the value of the metadata appending progress information and displays the updated thumbnail list screen 200a. The present step is equivalent to the processing in step S705 and step S710 illustrated in FIG. 7.

In step S809, the control unit B101 determines whether image recognition responses have been received from all of the image recognition servers in step S802. If it is determined that image recognition responses have been received from all of the image recognition servers in step S802 (YES in step S809), the control unit B101 advances the processing to step S810, and, if not so (NO in step S809), the control unit B101 advances the processing to step S825.

In step S810, the control unit B101 deletes the information temporarily stored in the RAM B103 in step S825 described below.

In step S811, the control unit B101 determines whether a thumbnail list display request has been received via the operation unit B105. If it is determined that the thumbnail list display request has been received via the operation unit B105 (YES in step S811), the control unit B101 advances the processing to step S812, and, if not so (NO in step S811), the control unit B101 advances the processing to step S813.

In step S812, the control unit B101 displays the thumbnail list screen 200a on the display unit B107. The present step is equivalent to the processing in step S308 illustrated in FIG. 7.

In step S813, the control unit B101 determines whether a search request has been received via the operation unit B105. If it is determined that the image search request has been received via the operation unit B105 (YES in step S813), the control unit B101 advances the processing to step S814, and, if not so (NO in step S813), the control unit B101 returns the processing to step S802.

In step S814, the control unit B101 displays the search screen 200b on the display unit B107. The present step is equivalent to the processing in step S321 illustrated in FIG. 7.

In step S815, the control unit B101 enables a sequential appending flag and stores the enabled sequential appending flag in the RAM B103. The present step is equivalent to the processing in step S712 illustrated in FIG. 7.

In step S816, the control unit B101 determines whether a search start request has been received via the operation unit B105. If it is determined that the search start request has been received via the operation unit B105 (YES in step S816), the control unit B101 advances the processing to step S817, and, if not so (NO in step S816), the control unit B101 advances the processing to step S818. The control unit B101 determines the search start button 205b being pressed via the operation unit B105 as a search start request.

In step S817, the control unit B101 displays the search result screen 200c on the display unit B107, and then returns the processing to step S802. The present step is equivalent to the processing in step S325 illustrated in FIG. 7.

In step S818, the control unit B101 determines whether a search stopping request has been received via the operation unit B105. If it is determined that the search stopping request has been received via the operation unit B105 (YES in step S818), the control unit B101 advances the processing to step S819, and, if not so (NO in step S818), the control unit B101 returns the processing to step S816. The control unit B101 determines the search cancel button 206b being pressed via the operation unit B105 as a search stopping request.

In step S819, the control unit B101 disables the sequential appending flag and stores the disabled sequential appending flag in the RAM B103. The present step is equivalent to the processing in step S715 illustrated in FIG. 7.

In step S820, the control unit B101 displays the thumbnail list screen 200a on the display unit B107. The present step is equivalent to the processing in step S308 illustrated in FIG. 7.

In step S821, the control unit B101 determines whether image recognition responses have been received from all of the image recognition servers in step S802. If it is determined that image recognition responses have been received from all of the image recognition servers in step S802 (YES in step S821), the control unit B101 advances the processing to step S806, and, if not so (NO in step S821), the control unit B101 advances the processing to step S825.

In step S822, the control unit B101 determines whether the search result screen 200c is in the process of being displayed on the display unit B107. If it is determined that the search result screen 200c is in the process of being displayed on the display unit B107 (YES in step S822), the control unit B101 advances the processing to step S823, and, if not so (NO in step S822), the control unit B101 advances the processing to step S809.

In step S823, the control unit B101 determines whether a subject included in the metadata appended in step S806 matches a metadata item selected as a search condition in step S816. If it is determined that the subject included in the metadata matches the search condition (YES in step S823), the control unit B101 advances the processing to step S824, and, if not so (NO in step S823), the control unit B101 advances the processing to step S809.

In step S824, the control unit B101 updates the search result screen 200c, which is in the process of being displayed on the display unit B107. In a case where the original image captured in step S502 is not displayed in the search result screen 200c, the control unit B101 adds such an original image to the search result screen 200c and displays the thus-updated search result screen 200c. At this time, in a case where metadata appending progress information included in the metadata appended in step S806 does not indicate 100%, the control unit B101 superimposes and displays the metadata appending incompletion indication 202a, the metadata appending progress indication 203a, and the metadata appending incompletion indication 201c on the original image captured in step S502. On the other hand, in a case where the metadata appending progress information indicates 100%, the control unit B101 deletes the metadata appending incompletion indication 202a and the metadata appending progress indication 203a and displays the metadata appending completion indication 201a in a superimposed manner. The present step is equivalent to the processing in step S713 and step S714 illustrated in FIG. 7.

In step S825, the control unit B101 temporarily stores information about the image recognition response received in step S802 or the information merged in step S804 in the RAM B103. The present step is equivalent to the processing in step S706 illustrated in FIG. 7.

Thus far is the description of the flowchart illustrating an operation of the camera B100 in the second exemplary embodiment.

As described above, the camera B100 in the second exemplary embodiment switches whether to sequentially append pieces of metadata or to, after receiving all of the recognition results, append pieces of metadata, according to the setting performed by the user or the status of the apparatus. With this configuration, in a case where the processing load on the camera B100 is low or the user hurries to use metadata, it is possible to prioritize a reduction in the time taken until metadata becomes usable, and, otherwise, it is possible to prioritize a reduction in the processing load on the camera B100.

OTHER EMBODIMENTS

While, in the above-described exemplary embodiments, an example in which the camera displays a plurality of captured images has been described, the camera can be configured to switch the display content between displaying of a single image and displaying of a plurality of images. More specifically, in the case of displaying of a single image, the camera can be configured to display the metadata appending incompletion indication 202a and the metadata appending progress indication 203a in a superimposed manner, and, in the case of displaying of a plurality of images, the camera can be configured to display only the metadata appending incompletion indication 202a in a superimposed manner.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiments, in a case where a plurality of cloud services each of which performs subject recognition is used, it is possible to switch between whether to prioritize a reduction in the processing load on the camera by, after receiving all of the recognition results, appending pieces of metadata or to prioritize a reduction in the time taken until metadata becomes usable by sequentially appending pieces of metadata based on obtained image recognition results, depending on the situation.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-182452 filed Oct. 2, 2019, which is hereby incorporated by reference herein in its entirety.

What is claimed is:

1. A server apparatus which transmits, to a plurality of other server apparatuses each of which performs subject recognition for an image, an image acquired from a client terminal and requests the plurality of other server apparatuses to perform subject recognition, the server apparatus comprising:

one or more processors; and at least one memory storing instructions executable by the one or more processors to perform operations comprising:

receiving a result of subject recognition from each of the plurality of other server apparatuses;

transmitting, to the client terminal, subject information to be appended to metadata of the image based on the received result of subject recognition;

controlling transmission of the subject information to switch whether to, each time a result of subject recognition is received from each of the plurality of other server apparatuses, transmit, to the client terminal, subject information that is based on the received result of subject recognition or to transmit, to the client terminal, subject information that is based on a result obtained by integrating respective results of subject recognition received from the plurality of other server apparatuses;

receiving, from the client terminal, information relating a state of the client terminal; and switching, based on the state of the client terminal, whether to transmit, in the transmitting, to the client terminal, the subject information that is based on the received result of the subject recognition each time the result of the subject recognition is received from each of the plurality of other server apparatuses, or transmit, in the transmitting, to the client terminal, the subject information that is based on the result obtained by integrating the respective results of the subject recognition received from the plurality of other server apparatuses without transmitting, to the client terminal, the subject information that is based on the received result of the subject recognition each time the result of the subject recognition is received from each of the plurality of other server apparatuses, wherein the state includes information indicating whether the client terminal is in a process of performing an image capturing operation or not.

2. The server apparatus according to claim 1, wherein the controlling controls the transmission depending on a status of the client terminal.

3. The server apparatus according to claim 2, wherein the controlling controls the transmission based on information indicating a status of the client terminal received together with the image.

4. The server apparatus according to claim 2, wherein, in a case where the client terminal is performing an image search, the controlling controls the transmission to, each time the result of the subject recognition is received from each of the plurality of other server apparatuses, transmit, to the client terminal, the subject information that is based on the received result of the subject recognition.

5. The server apparatus according to claim 2, wherein, in a case where a battery charge remaining amount of the client terminal is greater than a predetermined value, the controlling controls the transmission to, each time the result of the subject recognition is received from each of the plurality of other server apparatuses, transmit, to the client terminal, the subject information that is based on the received result of the subject recognition.

6. The server apparatus according to claim 2, wherein, in a case where a processing load on the client terminal is lower than a predetermined value, the controlling controls the transmission to, each time the result of the subject recognition is received from each of the plurality of other server apparatuses, transmit, to the client terminal, the subject information that is based on the received result of the subject recognition.

7. The server apparatus according to claim 1, wherein the controlling controls the transmission depending on a status of the server apparatus.

8. The server apparatus according to claim 7, wherein, in a case where a processing load on the server apparatus is lower than a predetermined value, the controlling controls the transmission to, each time the result of the subject recognition is received from each of the plurality of other server apparatuses, transmit, to the client terminal, the subject information that is based on the received result of the subject recognition.

9. The server apparatus according to claim 1, wherein the subject information includes a degree of reliability of a recognized subject.

10. A communication method comprising:

transmitting, to a plurality of server apparatuses each of which performs subject recognition for an image, an image acquired from a client terminal and requesting the plurality of server apparatuses to perform subject recognition;

receiving a result of subject recognition from each of the plurality of server apparatuses;

transmitting, to the client terminal, subject information to be appended to metadata of the image based on the received result of subject recognition;

controlling transmission of the subject information to switch whether to, each time a result of subject recognition is received from each of the plurality of server apparatuses, transmit, to the client terminal, subject information that is based on the received result of subject recognition or to transmit, to the client terminal, subject information that is based on a result obtained by integrating respective results of subject recognition received from the plurality of server apparatuses;

receiving, from the client terminal, information relating a state of the client terminal; and switching, based on the state of the client terminal, whether to transmit, in the transmitting, to the client terminal, the subject information that is based on the received result of the subject recognition each time the result of the subject recognition is received from each of the plurality of server apparatuses, or transmit, in the transmitting, to the client terminal, the subject information that is based on the result obtained by integrating the respective results of the subject recognition received from the plurality of server apparatuses without transmitting the subject information that is based on the received result of the subject recognition each time the result of the subject recognition is received from each of the plurality of server apparatuses, wherein the state includes information indicating whether the client terminal is in a process of performing an image capturing operation or not.

* * * * *